US006343718B1

(12) United States Patent
Montenieri et al.

(10) Patent No.: US 6,343,718 B1
(45) Date of Patent: Feb. 5, 2002

(54) UNIT DOSE DISPENSE PACKAGE

(75) Inventors: Robert E. Montenieri, Southingtown; Gary Tremley, Plainville, both of CT (US); Robert M. Summers, Middletown, NY (US)

(73) Assignee: Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/529,472

(22) PCT Filed: Oct. 15, 1998

(86) PCT No.: PCT/US98/21795

§ 371 Date: Apr. 14, 2000

§ 102(e) Date: Apr. 14, 2000

(87) PCT Pub. No.: WO99/19236

PCT Pub. Date: Apr. 22, 1999

(51) Int. Cl.[7] ........................ B65D 88/54; B65D 25/40; G01F 11/06

(52) U.S. Cl. ........................ 222/326; 222/327; 222/570

(58) Field of Search ................................ 222/326, 327, 222/569, 570, 386, 386.5, 80, 81, 541, 136

(56) References Cited

U.S. PATENT DOCUMENTS 963,840 A 7/1910 Whitaker, Jr.
1,265,533 A 5/1918 Searle
1,595,889 A 8/1926 Stevens
1,602,543 A 10/1926 Martin, Jr.
1,761,650 A 6/1930 Beardsley et al.
2,195,234 A 3/1940 Brown
2,528,530 A 11/1950 Machleder
2,646,906 A 7/1953 Jones et al.
2,724,385 A 11/1955 Lockhart
2,887,253 A 5/1959 Biedenstein
2,941,699 A 6/1960 Schmidt et al.
3,144,966 A 8/1964 Cook
3,211,431 A 10/1965 Meysembourg et al.
3,250,442 A 5/1966 Bell et al.
3,272,401 A 9/1966 Fendler et al.
3,282,473 A 11/1966 Moore
3,337,039 A 8/1967 Knittel et al.
3,472,433 A 10/1969 Thomas
3,503,542 A 3/1970 Ungerer
3,595,439 A * 7/1971 Newby ........................ 222/80
3,715,189 A 2/1973 Nighohossian et al.
3,756,390 A 9/1973 Abbey et al.
3,815,791 A 6/1974 Clark
4,019,654 A 4/1977 van Manen
4,208,133 A 6/1980 Korte-Jungermann
4,216,885 A * 8/1980 Sedam ....................... 222/481
4,231,492 A 11/1980 Rios
4,356,935 A 11/1982 Kamin
4,508,245 A 4/1985 Houlbrook et al.
4,522,316 A 6/1985 Hoffmann et al.
4,556,156 A 12/1985 Frutin (List continued on next page.)

*Primary Examiner*—David A. Scherbel
*Assistant Examiner*—Davis Hwu
(74) *Attorney, Agent, or Firm*—Hoffmann & Baron, LLP

(57) ABSTRACT

A unit dose storage and dispenser cartridge for a unit dose of an ingredient includes a storage and dispense container dispensably containing a unit dose of the ingredient. The container includes a cylindrical interior wall defining a cartridge passageway having an ingredient-containing ingredient storage cavity portion. The container further defines a dispense opening communicating with the ingredient storage cavity portion and includes a first scaling member removably sealing the dispense opening. A dispense piston is movable by a dasher rod through the ingredient storage cavity portion so as to dispense the unit dose of the ingredient through the dispense opening. An openable vent is positioned in registry with the cartridge passageway.

17 Claims, 4 Drawing Sheets

U.S. PATENT DOCUMENTS

| | | | |
|---|---|---|---|
| 4,605,129 A | | 8/1986 | Detzel et al. |
| 4,645,073 A | | 2/1987 | Homan |
| 4,645,098 A | | 2/1987 | Hoffman |
| 4,749,105 A | | 6/1988 | Derksen |
| 4,768,568 A | | 9/1988 | Fournier et al. |
| 4,779,991 A | | 10/1988 | Kitamura et al. |
| 4,792,065 A | | 12/1988 | Soehnlein et al. |
| 4,834,149 A | | 5/1989 | Fournier et al. |
| 4,858,759 A | | 8/1989 | Mauthe et al. |
| 4,936,445 A | | 6/1990 | Grabenkort |
| 4,941,751 A | | 7/1990 | Mühlbauer |
| 4,971,193 A | | 11/1990 | Groves et al. |
| 4,986,322 A | | 1/1991 | Chibret et al. |
| 5,027,872 A | | 7/1991 | Taylor et al. |
| 5,052,588 A | | 10/1991 | Schlosser |
| 5,114,011 A | | 5/1992 | Robbins, III |
| 5,137,184 A | | 8/1992 | Jackson et al. |
| 5,152,965 A | | 10/1992 | Fisk et al. |
| 5,158,214 A | | 10/1992 | Volpe et al. |
| 5,209,565 A | | 5/1993 | Goncalves |
| 5,409,141 A | | 4/1995 | Kikuchi et al. |
| 5,571,538 A | * | 11/1996 | Cloud ......................... 425/87 |

* cited by examiner

UNIT DOSE DISPENSE PACKAGE

BACKGROUND OF THE INVENTION

1. Field of the Invention

The present invention relates to the field of dispense containers. More specifically, the present invention is directed to a unit dose dispense container for an activating catalyst for a heat curable impregnant.

2. Description of Related Art

The invention relates to a unit dose cartridge container for an ingredient to be mixed with a given quantity of a mixing component. A typical use for the present invention is as a storage and dispense cartridge for vazo catalyst. The vazo catalyst is typically dispensed into a 5 gallon carboy, having a 4 gallon fill, of heat cure impregnant. The combined mixture is then used for sealing porous metal or plastic parts.

Typically, the catalyst is added to the impregnant at the manufacturing facility where the mixture is also then applied. Current methods for mixing the catalyst with the impregnant involve manually scooping an amount of vazo paste from a wide mouth liter container. Once the vazo has been added to the 5 gallon carboy, the carboy is closed and then shaken until the vazo mixes in with the impregnant.

A liter container of vazo catalyst, however, includes about one kilogram of vazo catalyst which can catalyze about 7.6 carboys of heat cure impregnant. As the carboy of heat cure impregnant typically has a smaller opening than the vazo container, a certain amount of vazo scooping and scraping is required to complete the transfer. Furthermore, the measuring tools used by each operator may vary so that such mixing methods elude precise dispensement of the ideal amount of catalyst for a carboy of impregnant. As a result, the catalyzation rate for each carboy of mixture may vary from operator to operator. Such variances resulting from the imprecise apportioning of the vazo thereby inhibit precise quality control of the applied mixture.

These known methods for dispensing the vazo catalyst also pose risks for personnel and the environment. For example, manually scooping the vazo may expose an operator to the vazo paste itself, which is an irritant. Also, as the liter container does not provide vazo for an even number of carboys, and as the scooping method does not provide for precise measurement of the amount of vazo scooped, it is very possible that a discarded liter container may still contain some amounts of vazo therein which may then accumulate at a landfill.

It is known in the art that the vazo catalyst may be mixed with the impregnant prior to shipping, but the mixture must then be shipped refrigerated to maintain its viability. As the two ingredients may need to shipped to various facilities remote from the site of manufacture of the components, the increased costs for refrigerated shipping of the mixture make this method unacceptably expensive.

It is therefore desirable to provide a transportation and dispense cartridge for vazo catalyst which reduces or eliminates risks to personnel and the environment and which provides higher assurance of precise catalyst dispensement into a carboy of heat cure impregnant.

SUMMARY OF THE INVENTION

The present invention provides a unit dose storage and dispenser cartridge for a unit dose of an ingredient includes a storage and dispense container dispensably containing a unit dose of the ingredient. The container includes a cylindrical interior wall defining a cartridge passageway having an ingredient-containing ingredient storage cavity portion. The container further defines a dispense opening communicating with the ingredient storage cavity portion and includes a first sealing member removably sealing the dispense opening. A dispense piston is movable by a dasher rod through the ingredient storage cavity portion so as to dispense the unit dose of the ingredient through the dispense opening. An openable vent is positioned in registry with the cartridge passageway. It is contemplated that the a dasher rod may be provided for each cartridge or that a single dasher rod may be provided for a given number of cartridges. It is further contemplated that the present invention may be provided in kit form.

The present invention will be more readily appreciated in a reading of the "Detailed Description of the Invention" with reference to the following drawings.

DETAILED DESCRIPTION OF THE INVENTION

Figure 1:
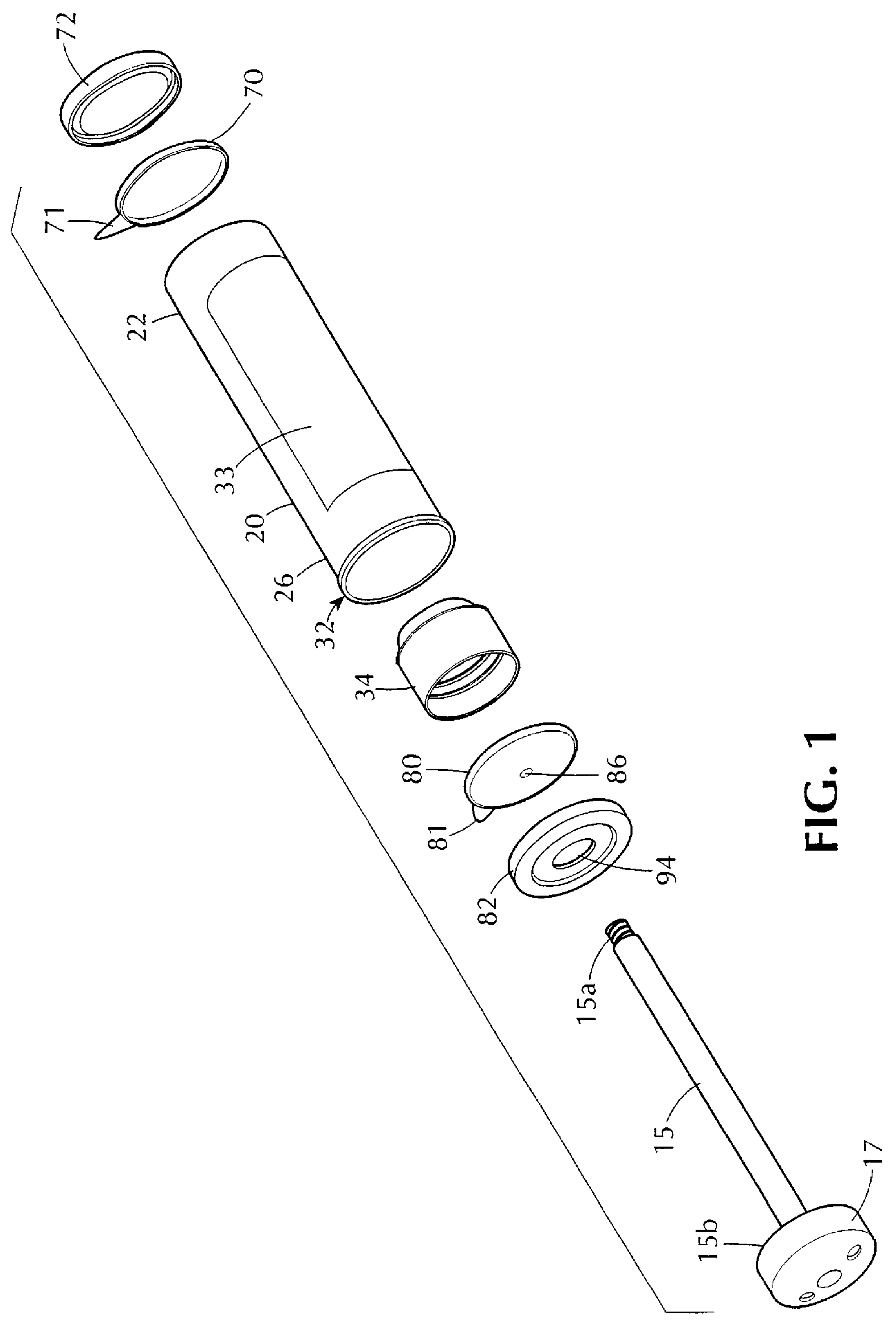
FIG. 1 shows an exploded view of the unit dose cartridge assembly and dasher rod of the present invention.
Figure 2:
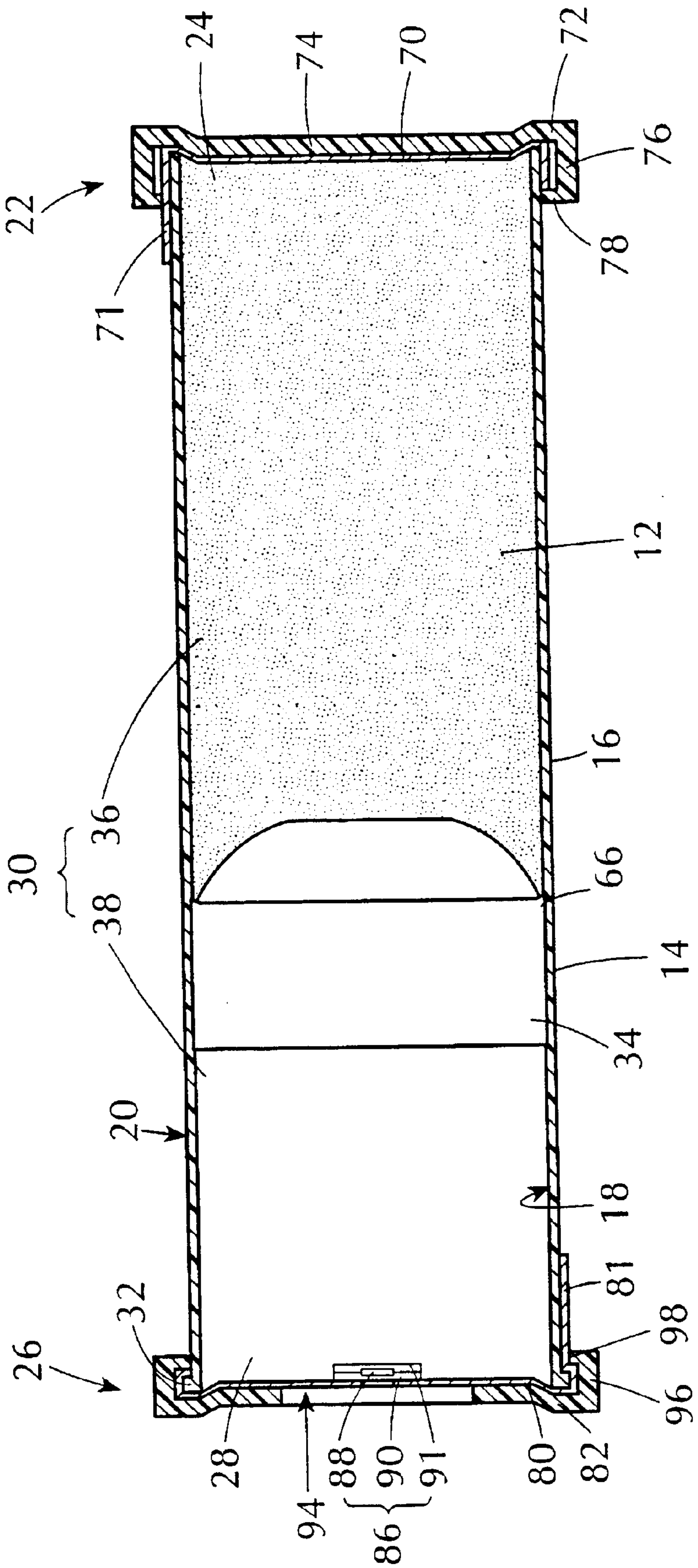
FIG. 2 shows a longitudinal sectional view of the unit dose cartridge assembly of the present invention.
Figure 3:
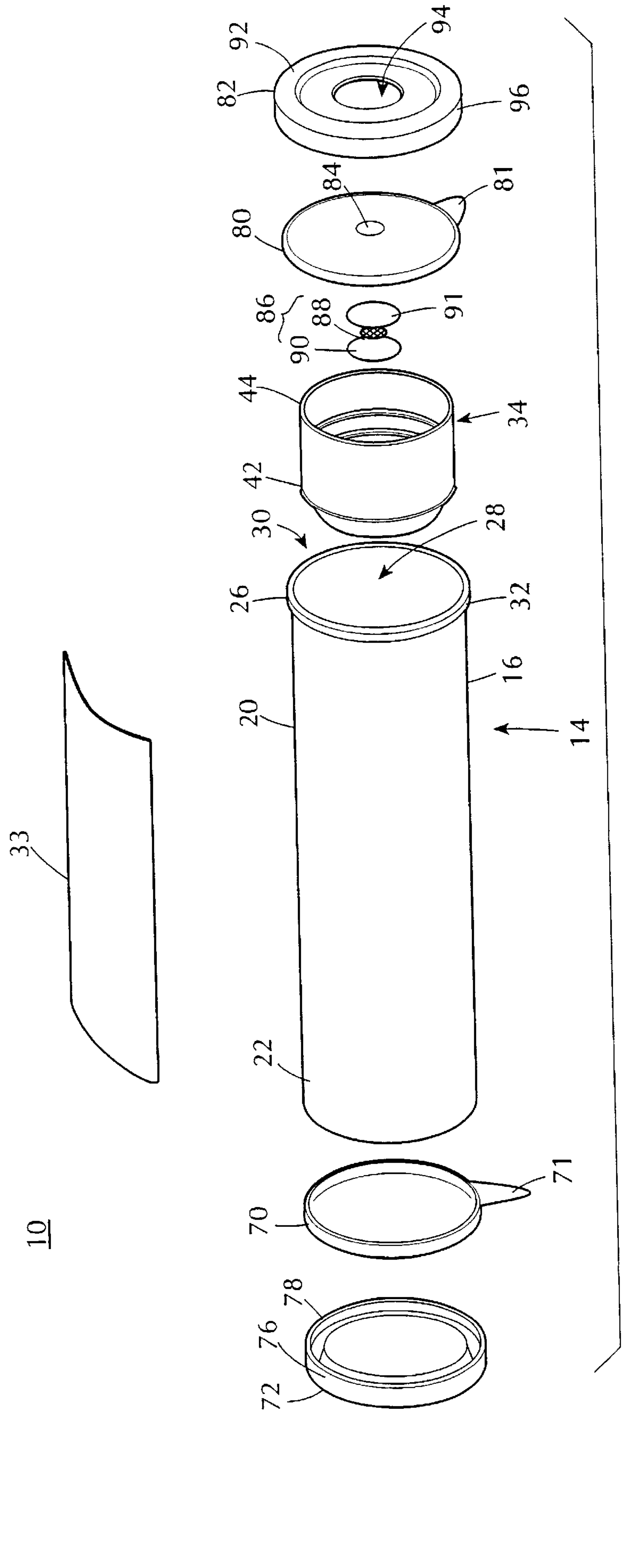
FIG. 3 shows an exploded view of the unit dose cartridge assembly of FIG. 2.

Referring to FIGS. 1–3, the present invention provides a cartridge assembly 10 for containing and dispensing a precise unit dose of an ingredient. Assembly 10 is particularly useful for containing and dispensing a vazo catalyst 12 into a carboy of heat cure impregnant (not shown). While the present invention is described for storing and containing a unit dose of vazo catalyst 12, it is understood that the present invention may be used for storing and dispensing any ingredient. The components of assembly 10, except where later noted, are desirably formed of a suitable plastic material. Assembly 10 includes a cartridge housing 14 for containing a precise unit dose of catalyst 12. An example of a vazo catalyst which may be contained and dispensed by cartridge assembly 10 is sold by the assignee of the present invention under the tradename "RESINOL® INITIATOR PASTE". One type of heat cure impregnant especially suited to be mixed with vazo catalyst 12 is currently sold by the assignee of the present invention under the tradename "90C STOCK SOLUTION".

Cartridge assembly 10 includes an elongate tubular cartridge housing 14. Cartridge housing 14 includes an elongate cylindrical wall 16 having an interior surface 18 and an exterior surface 20. Cylindrical tube 16 includes a distal open end 22 defining a dispense opening 24 and a proximal open end 26 defining a mechanical access, or dasher-insertion, opening 28. Cylindrical wall 16 defines an elongate cartridge interior 30 in fluid communication with dispense opening 24 and dasher-insertion opening 28. The exterior surface 20 of cylindrical wall 16 has formed thereon an annular rib 32 in flush edge relationship with second end 26. It is also contemplated that a label 33 carrying visual indicia may be adhered to exterior surface 20 of cylindrical wall 16.

An elongate rigid dasher rod 15 may be provided as a kit with cartridge assembly 10, or alternatively, one dasher rod

15 may be provided per shipping unit of multiple cartridge assemblies. Dasher rod 15 is desirably formed of a suitable plastic material and includes a tapered first end 15*a* for insertion into cartridge housing 14 and a second end 15*b* from which an operator manually drives first end 15*a*. Second end 15*b* desirably terminates at a disc-shaped dasher head 17. The length of dasher rod 15 is desirably selected as described hereinbelow. It is contemplated that the function of dasher rod 15 may be performed by any object having the described characteristics including, by way of illustration and not by limitation, a screwdriver.

Assembly 10 further includes a piston 34 to be inserted into cartridge interior 30 of cartridge housing 14 so as to provide slidable friction engagement with interior surface 18 of cylindrical wall 16. Once inserted in cartridge housing 14 piston 34 further divides cartridge interior 30 between an ingredient storage cavity portion 36 extending between piston 34 and dispense opening 24 and a dasher-receiving portion 38 extending between dasher-insertion opening 28 and piston 34. Cartridge housing 14 holds vazo catalyst 12 within and dispenses vazo catalyst 12 from ingredient storage cavity portion 36.

Figure 4:
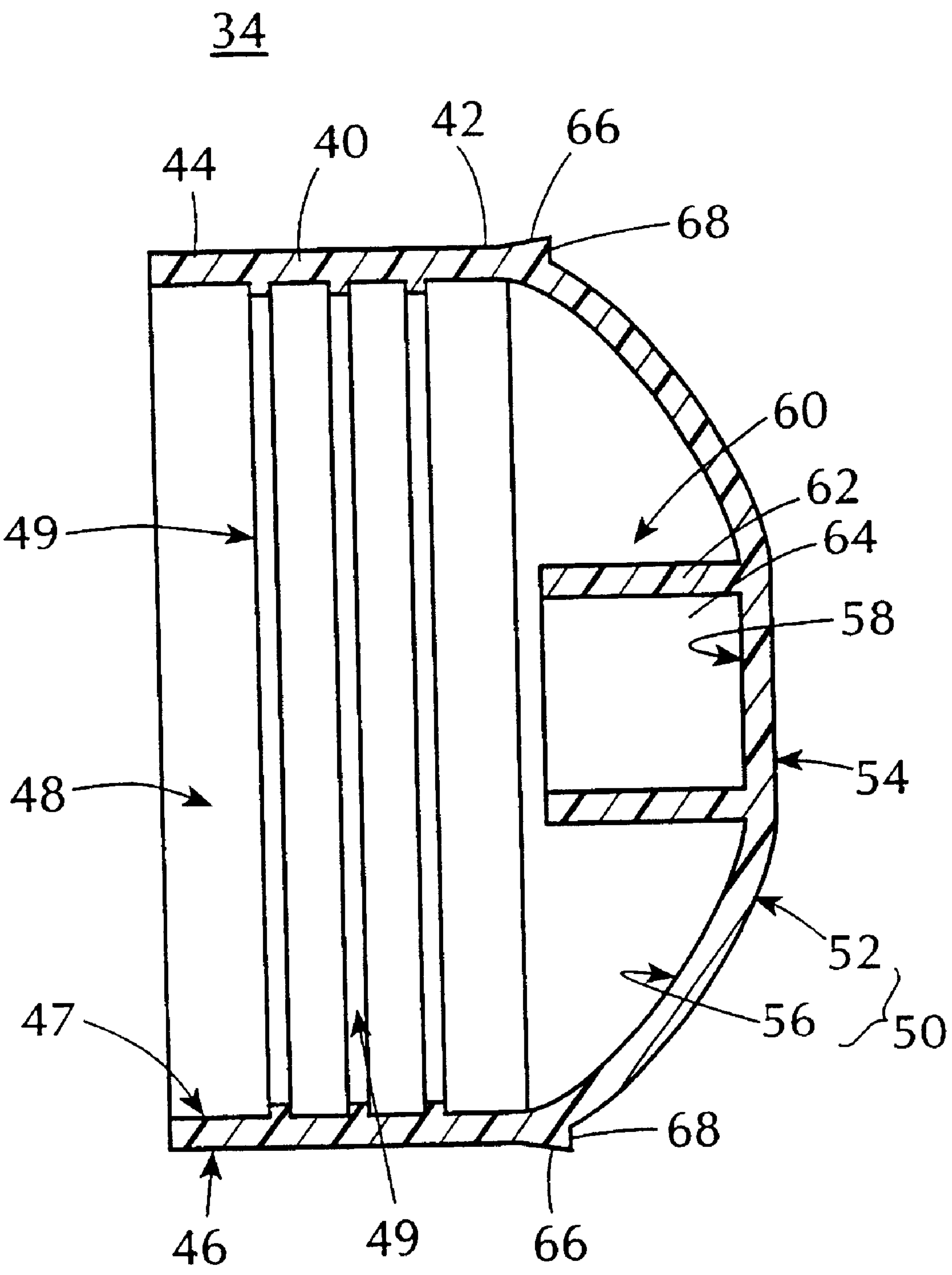
FIG. 4 shows a longitudinal sectional view of the piston employed in the unit dose cartridge assembly of the present invention.

With additional reference to FIG. 4, piston 34 includes an elongate cylindrical piston wall 40 having a distal end 42 and a proximal end 44. Cylindrical piston wall 40 includes exterior piston wall surface 46, an interior piston wall surface 47, and defines a piston interior 48. Interior piston wall surface 47 desirably has formed thereon a number of annular stiffening ribs 49 to provide increased structural rigidity to cylindrical piston wall 40. Exterior piston wall surface 46 is formed to provide slidable friction engagement with interior surface 18 of cylindrical wall 16.

A rounded piston end wall 50 extends from distal end 42 so as to provide a convex surface 52 extending into the ingredient storage cavity portion 36 of assembly 10. Convex surface 52 terminates at a central transverse planar surface 54. End wall 50 also provides a concave surface 56 facing piston interior 48 and dasher-receiving portion 38 of housing 14. Concave surface 56 circumferentially bounds an axially central planar surface 58, opposite planar surface 54. A dasher-engagement hub 60 extends from planar surface 58 towards piston interior 48 and includes a cylindrical hub wall 62 defining a dasher receiving cavity 64. Hub 60 accommodates distal end 15*a* of dasher rod 15 in frictional or abutting engagement.

Piston 34 desirably includes an annular flared wiping rib 66 extending distally from distal end 42 of cylindrical piston wall 40. An annular groove 68 is defined between convex surface 52 and wiping rib 66. Wiping rib 66 is formed to provide a wiping engagement with interior surface 18 of cylindrical wall 16 as piston 34 is used to push vazo catalyst 12 through ingredient storage cavity portion 36 towards dispense end 22. Wiping rib 66 thereby reduces the amount of residual vazo catalyst 12 remaining within cartridge housing 14 after dispensement.

Referring again to FIGS. 1–3, both dispense opening 24 and dasher-insertion opening 28 of cartridge housing 14 are sealed for transportation and storage purposes. Desirably, cartridge housing 14 provides an hermetically sealed container of vazo catalyst 12. A dispense seal 70 is removably affixed over dispense opening 24. Dispense seal 70 is desirably formed of a metallic foil such as aluminum foil or tin foil. Dispense seal 70 may be adhered to cartridge housing 14 or simply held in place by a dispense end cap 72. While dispense seal 70 is formed having a substantially circular shape, it desirably provides a graspable tab 71 extending radially outward therefrom. Tab 71 assists an operator in pealing dispense seal 70 from cartridge housing 14 prior to dispensing vazo catalyst 12. Dispense end cap 72 is secured over dispense seal 70 in frictional engagement with dispense end 24. Dispense end cap 72 includes a substantially planar circular base 74 circumferentially bounded by an upstanding housing engagement wall 76. Housing engagement wall 76 may include an annular housing engagement rib 78 disposed over circular base 74 so as to enhance the deflectable frictional engagement of housing engagement wall 76 with cartridge housing 14.

As cartridge assembly 10 may be subjected to high temperatures during its storage and transportation, a vented seal 80 is provided to relieve any resulting excessive pressure build-up within cartridge interior 30. Vented seal 80 removably affixed to tube proximal end 26 over dasher-insertion opening 28. Vented seal 80 is desirably formed of a metallic foil such as aluminum foil or tin foil. Vented seal 80 is desirably adhered to cartridge housing 14 or simply held in place by a proximal end cap 82. While vented seal 80 is formed having a substantially circular shape, it desirably provides a graspable tab 81 extending radially outward therefrom. Tab 81 assists an operator in pealing vented seal 80 from cartridge housing 14.

Vented seal 80 includes a centrally-located vent aperture 84 to be positioned in registry with dasher-receiving portion 38 of cartridge interior 30. Vent aperture 84 is covered from cartridge interior 30 by a pressure-relief vent 86. Vent 86 includes a venting plug 88 in registry with vent aperture 84. Venting plug 88 is perimetrically bounded by and concentrically interposed between a first laminate member 90 and a second laminate member 91. First laminate layer 90 adhesively attaches to vented seal 80. Venting plug 88 is desirably formed of microporous polytetraflouroethylene. Vent 86 is of the type known in the art and will prevent the exchange of air through vent aperture 84 until elevated temperatures cause excessive pressure build-up in cartridge interior 30, at which point vent 86 will open and allow the high pressure air to escape through vent aperture 84.

Proximal end cap 82 is secured over vented seal 80 and annular rib 32 so as to provide frictional engagement with proximal end 26 of cartridge housing 14. Proximal end cap 82 is a substantially disc-like member including a planar circular base 92 which defines a central aperture 94 and which is circumferentially bounded by an upstanding housing engagement wall 96. Central aperture 94 is formed to be positionable in registry with vent aperture 84 and to allow dasher rod 15 to be inserted therethrough to engage piston 34. Central aperture 94 is desirably too small to allow dasher head 17 therethrough in order that circular base 92 may prevent dasher head from being pushed into cartridge interior 30. The length of dasher rod 15 is optimally selected so as not to force piston 34 out from cartridge interior 30 when dasher head 17 abuts proximal end cap 82 while also desirably exposing convex surface 52 of piston 34 through dispense opening 24.

Housing engagement wall 96 of end cap 82 may include an annular housing engagement rib 98 disposed over circular base 92 so as to enhance the deflectable frictional engagement of housing engagement wall 96 with cartridge housing 14. As proximal end cap 82 must also deflectably engage annular rib 32 projecting from exterior cylindrical wall 20 and dispense end cap 72 need only deflectably engage exterior cylindrical wall 20, assembly 10 desirably requires proximal end cap 82 to have a larger sealing diameter than dispense end cap 72. By providing end caps 72 and 82 with different sealing diameters, assembly 10 provides an antimalassembly feature that ensures the end caps 72 and 82 will be placed over the appropriate end 22 and 26, respectively, of tube 16.

Cartridge assembly 10 may therefore be constructed to hold a precise unit dose, i.e. about 130 grams, of vazo catalyst 12 for mixing with a five gallon carboy of heat cure impregnant. The present invention minimizes operator exposure to vazo catalyst 12 by providing a single use disposable cartridge which minimizes operator handling of components that contact the vazo. Additionally, by providing and cleanly dispensing a precise unit dose of vazo catalyst 12, the present invention significantly reduces the amount of excess or unused vazo catalyst paste that may be thrown away.

An operator may dispense vazo catalyst 12 from Cartridge assembly 10 as follows. Dasher rod 15 may be inserted through central aperture 94 of proximal end cap 82 to puncture vented seal 80 so as to extend through dasher-receiving portion 38 and to engage piston 34. Tapered first end 15*a* of dasher rod 15 desirably partially extends into dasher receiving cavity 64 and engages hub wall 62 of dasher-engagement hub 60. The operator may then remove dispense end cap 72 and peal dispense seal 70 from distal end 22 of cartridge housing 14 to expose vazo catalyst 12. Dispense opening 24 is then placed in registry with, or into, an opening of a carboy of heat cure impregnant. Holding cartridge assembly 10 in the carboy opening, the operator would then push on dasher head 17 of dasher rod 15 to force piston 34 distally towards dispense opening 24 so as to dispense vazo catalyst 12 into the carboy. As piston 34 moves towards dispense opening 24, wiping rib 66 wipingly slides along interior cylindrical wall 18 to minimize residual catalyst 12 remaining within cartridge interior 30. The operator will continue pushing piston 34 distally until convex surface 50 extends fully from cartridge interior 30. In this fully extended position, cylindrical piston wall 40 still frictionally engages interior cylindrical wall 18. The length of dasher rod 15 is therefor desirably selected to be sufficient to fully extend convex surface 50 from cartridge interior 30 yet also to be insufficient to inadvertently force piston 34 out of cartridge interior 30.

While the preferred embodiment of the present invention has been shown and described in detail above, it will be evident to those persons of ordinary skill that changes and modifications may be made without departing from the teachings of the invention. Accordingly, that which is set forth in the foregoing description and accompanying drawings is offered by way of illustration only and not as a limitation. The true scope of the invention is defined by the claims.

What is claimed is:

1. A unit-dose storage and dispenser cartridge for an ingredient, comprising: an elongate tubular container having a first end defining a dispense opening, a second end defining a dasher-insertion opening, and an elongate passageway extending between said dispense and dasher-insertion openings;

a first cover removably sealingly attached to said first end in registry with said dispense opening, wherein said first cover comprises a first metallic foil member affixed to said container first end;

a second cover removably sealingly attached to said second end in registry with said dasher-insertion opening, wherein said s second cover comprises a second metallic foil member affixed to said container second end;

a piston member slidably received within said passageway, said piston having a first major surface and an opposed second major surface, said piston being positionable within said container so as to define an ingredient storage cavity portion of said passageway between said first major surface of said piston and said first end of said ingredient storage cavity portion, said ingredient storage cavity portion having a volume for accepting a unit dose of said ingredient;

a dasher rod insertable through said dasher-insertion opening and engageable with said second major surface of said piston member for effecting slidable movement of said piston member to dispense said unit dose of said ingredient through said dispense opening; and a pressure-relief vent supported on one of said first and second metallic foils for selectively venting excessive internal pressure generated within said passageway prior to insertion of said dasher rod through said dasher-insertion opening.

2. The cartridge of claim 1, wherein said ingredient is a vazo catalyst.

3. The cartridge of claim 1, wherein said first cover further comprises a first cap affixed to said first end.

4. The cartridge of claim 3, wherein said second cover further comprises a second cap affixed to said second end, said second cap having a different sealing diameter than said first cap.

5. The cartridge of claim 4, wherein said second cap further defines a push-rod aperture for passage of said push-rod therethrough to engage said second major surface of said piston.

6. The cartridge of claim 1, wherein said first major surface of said piston has an arcuate shape.

7. The cartridge of claim 1, wherein said piston further includes a deflectable annular rim for wiping sliding engagement with said interior surface.

8. The cartridge of claim 1, wherein said second major surface of said piston defines a push-rod receiving hub for engaging said dasher.

9. A kit for storing and dispensing a unit dose of an ingredient into a volume of mixture, comprising:

an elongate hollow storage and dispense cartridge for dispensably housing a unit dose of said ingredient in sealed containment, said cartridge defining an elongate cartridge passageway communicating between a dispense end and a dasher-insertion end;

a piston adapted for slidable wiping engagement with said cartridge within said cartridge passageway, said unit dose of said ingredient to be positionable between said dispense end and said piston;

a pair of removable sealing members adapted for removable sealing engagement with said ends, wherein said pair or removable sealing members further comprises a first metallic foil adhered over said dispense end and a second metallic foil adhered over said dasher-insertion end of said dispense cartridge, wherein one of said first and second metallic foils further supports a pressure-relief vent for selectively venting excessive internal pressure generated within said passageway; and a dasher rod adapted to be operable with said piston through said dasher-insertion end to dispense said unit dose of said ingredient therefrom in a single stroke.

10. A unit dose storage and dispenser cartridge for a unit dose of an ingredient, comprising:

a storage and dispense container dispensably containing a unit dose of said ingredient, said container having a cylindrical interior wall defining a dispense opening, a dasher-insertion opening and a cartridge passageway having an ingredient-containing ingredient storage cavity portion extending therebetween, said container further including a first sealing member removably sealing said dispense opening comprising a first metallic foil member and a second sealing member removable sealing said dasher-insertion opening comprising a second metallic foil member;

a dispense piston movable through said ingredient storage cavity portion so as to dispense said unit dose of said ingredient through said dispense opening; and a pressure-relief vent supported by said second metallic foil member and positioned in registry with said cartridge passageway, said pressure-relief vent for selectively venting excessive internal pressure generated within said cartridge passageway.

11. The cartridge of claim 10, wherein said first sealing member further comprises a first endcap affixed over said first metallic foil member.

12. The cartridge of claim 11, wherein said first foil member is adhered to said container.

13. The cartridge of claim 10, wherein said wherein said second sealing member further comprises a second endcap affixed over said second metallic foil member, and wherein said container further includes an annular projection on said container about said dasher-insertion opening so as to require said first and second endcaps to be adapted to sealingly engage only one end of said container.

14. The cartridge of claim 13, wherein said second endcap further defines a push-rod aperture for passage of said push-rod therethrough to engage said dispense piston.

15. The cartridge of claim 10, wherein said dispense piston includes an arcuate surface adjacent said ingredient and a deflectable annular rim for wiping sliding engagement with said interior wall of said container.

16. The cartridge of claim 10, wherein said ingredient is a vazo catalyst paste to be dispensed into a container of heat cure impregnant.

17. The cartridge of claim 10, further comprising a dasher rod disengagably engagable with said dispense piston through said dasher-insertion opening for urging said piston towards said dispense opening so as to effect dispensement of said ingredient.

* * * * *